Patented June 4, 1946

2,401,339

UNITED STATES PATENT OFFICE 2,401,339

TREATMENT OF OILS AND WAXES

Russell P. Dunmire, Shaker Heights, Ohio, assignor, by mesne assignments, to Buckeye Laboratories Corporation, Cleveland, Ohio, a corporation of Ohio No Drawing. Application November 26, 1941, Serial No. 420,595

6 Claims. (Cl. 260—428)

My invention is directed to the process of treating, purifying or re-refining fatty substances of the class consisting of oils and waxes and compounded oils and more particularly to vegetable and animal oils and waxes and compounded oils of the class consisting of mineral oils compounded with an oil-soluble additive substance.

This application is a continuation in part of my pending application Serial No. 412,049, filed September 23, 1941, for Treatment of vegetable fatty substances.

All fatty substances and particularly vegetable and animal oils and waxes and compounded oils of the class consisting of mineral oils compounded with an oil soluble additive substance are subject to more or less deterioration when exposed to air, moisture, or other agents which cause contamination such as results from the formation of the products of oxidation hydrolysis, polymerization, etc., as well as contamination by solid materials in suspension, and by liquid substances both in polyphase mixtures and solution.

An object of my invention is directed to the treatment and purification of a fatty substance of the class consisting of vegetable and animal oils and waxes by subjecting the fatty substance to a process utilizing a combined action of adsorption and distillation.

Another object of my invention is directed to the process of re-refining contaminated or used vegetable and animal fatty substances of the class consisting of oil and waxes to render same in a state of purification.

Another object of my invention is directed to the process of purifying a contaminated or used fatty substance of the class consisting of vegetable and animal oils and waxes by subjecting same to a re-refining process utilizing a combined action of adsorption and distillation, wherein the high boiling point or substantially non-volatile impurities or undesirable constituents are removed by adsorption and the low boiling point volatile impurities or undesirable constituents are removed by distillation.

Another object of my invention is directed to the process of purifying a contaminated or used fatty substance of the class consisting of vegetable and animal oils and waxes by subjecting same to a re-refining process utilizing the combined action of adsorption and distillation, wherein the distillation is carried out at a temperature in the range of the incipient azeotropic distillation point of the constituents comprising the vegetable and animal substance.

Another object of my invention is directed to the process of purifying a contaminated or used fatty substance of the class consisting of vegetable and animal oils and waxes by subjecting same to a re-refining process utilizing the combined action of adsorption and distillation, wherein the distillation is carried out at a temperature determined by the incipient azeotropic distillation point of the constituents comprising the vegetable and animal substance.

Another object of my invention is directed to a process for purifying a contaminated or used fatty substance of the class consisting of vegetable and animal oils and waxes wherein the process does not damage or materially change the characteristics of the vegetable or animal oils or waxes being purified.

Another object of my invention is the process of purifying a contaminated or used fatty substance of the class consisting of vegetable and animal oils and waxes under conditions to give a maximum yield and yet obtain a good purified product.

Another object of my invention is directed to the treatment and purification of a compounded oil of the class consisting of mineral oil compounded with an oil-soluble additive substance by subjecting the compounded oil to a process utilizing a combined action of adsorption and distillation.

Another object of my invention is directed to the process of re-refining contaminated or used compounded oils of the class consisting of mineral oils compounded with an oil-soluble additive substance to render same in a state of purification.

Another object of my invention is directed to the process of purifying the contaminated or used compounded oil of the class consisting of mineral oils compounded with an oil-soluble additive substance by subjecting same to a re-refining process utilizing a combined action of adsorption and distillation, wherein the high boiling point or substantially non-volatile impurities or undesirable constituents are removed by adsorption and the low boiling point volatile impurities or undesirable constituents are removed by distillation.

Another object of my invention is directed to the process of purifying a contaminated or used compounded oil of the class consisting of mineral oil compounded with an oil soluble additive substance by subjecting same to a re-refining process utilizing the combined action of adsorption and distillation, wherein the distillation is carried out at a temperature in the range of the incipient azeotropic distillation point of the constituents comprising the compounded oils.

Another object of my invention is directed to the process of purifying a contaminated or used compounded oil of the class consisting of mineral oil compounded with an oil soluble additive substance by subjecting the same to a re-refining process utilizing the combined action of adsorption and distillation, wherein the distillation is carried out at a temperature determined by the incipient azeotropic distillation point of the constituents comprising the compounded oil.

Another object of my invention is directed to a process for purifying a contaminated or used compounded oil of the class consisting of mineral oil compounded with an oil soluble additive substance wherein the process does not damage or materially change the characteristics of the compounded oil being purified or the oil soluble additive substance therein.

Another object of my invention is the process of purifying a contaminated or used compounded oil of the class consisting of mineral oil compounded with an oil soluble additive substance under conditions to give a maximum yield and yet obtain a good purified product.

The term "contaminated" as used herein and also in the claims means an oil or wax which is unfit or unsatisfactory for a specific purpose.

Other objects and a fuller understanding of my invention may be had by referring to the following description and claims.

In carrying out my process, the contaminated or used oil or wax to be treated is transferred to a suitable reaction vessel or container which is equipped with a mechanical agitator and which is arranged to be evacuated by any suitable means. The reaction vessel or container is also arranged to be heated for the purpose of carrying out the process. In other words, the reaction vessel or container comprises a retort provided with a mechanical agitator and is connected to a condensate receiver to carry out fractional or partial distillation involved in the re-refining process. To the contaminated or used oil or wax being treated I add a supply of solid adsorbent material in the retort or steel container. The amount of the solid adsorbent material which is added to the retort chamber may vary with the particular type or the quantity of the oil or wax being treated and the process should be carried out with a sufficient amount of solid adsorbent material to effectively adsorb all of the adsorbable impurities in the contaminated or used oil or wax being treated. The solid adsorbent material may comprise bone char, carbon black, fuller's earth, etc. The combined mixture of the contaminated or used oil or wax being treated and the adsorbent material is vigorously agitated by mechanical means in the retort under a vacuum preferably in the range of 28 inches to 30 inches of mercury as referred to a 30 inch barometer at sea level. In addition to the adsorbent material, an aqueous medium may be added in the form of water or steam as a sweeping agent.

Generally speaking, all oils and waxes are mixtures of various hydrocarbons or of fatty acids, glycerides or other esters. As such, they possess the property of ideal solutions obeying Raoult's Law and Henry's Law and are governed by the laws of distillation which apply to azeotropic mixtures. In the re-refining process comprising the combination of adsorption and distillation, I have found that the most satisfactory combination of property, color and yield is obtained when the oil or wax being treated is held at a temperature at which azeotropic distillation of the mixture begins as evidenced by a collection of distillates in the distillate receiver; that is to say, at a temperature at which the first initial fraction of the oil or wax begins to distill off under the conditions of operation. This temperature at which the first initial fraction of the oil or wax begins to distill off will be referred to herein as the incipient azeotropic distillation point of the constituents of the oil or wax being treated.

At temperatures materially below the incipient azeotropic distillation point a sufficiently high degree of purification is not obtained. At temperatures greatly beyond the incipient azeotropic distillation point the results are not completely satisfactory either from the standpoint of property and color of the re-refined product or from that of yield, or from both. The temperature range extends up to a value substantially 100° F. beyond the incipient azeotropic distillation point of the constituents of the oil or wax in its finally treated state and includes an elevated temperature in the range of the incipient azeotropic distillation point of the constituents of the oil or wax in its finally treated state and preferably embraces a range approximately 100° F. on either side of the incipient azeotropic distillation point of the constituents of the oil or wax in its finally treated state.

The treatment at temperatures in excess of approximately 100° F. beyond the incipient azeotropic distillation point leads to discoloration of the final product and also reduces the yield because of the losses by distillation of the oils and waxes. The treatment at temperatures less than 100° F. below the incipient azeotropic distillation point gives a satisfactory yield but a sufficiently high degree of purification is not obtained because the maximum effect of the adsorbent is not attained in this low range of temperature.

The mechanical agitation or stirring of the combined mixture of the contaminated or used oil or wax being treated and the adsorbent material in the sealed container brings all of the constituents thereof in close intimate physical contact and the adsorbent material thereby adsorbs the high boiling point impurities or contaminants of the oil or waxes being treated which are substantially non-volatile under the conditions of operation. The heating of the retort drives off substantially all of the low boiling point volatile impurities by distillation. The final mass in the retort after the heating and stirring is finished is then removed from the retort and filtered by any suitable means. The filtering separates the adsorbent material with the adsorbed impurities from the oil or wax being treated to recover the oil or wax. The filter also removes any solid particles originally present in the contaminated or used oil or wax being treated.

For efficient operation, the time of the agitation may vary from 15 minutes to one hour or more depending upon the temperatures employed in the re-refining process, the amount of the adsorbent material employed, and the degree to which the oil or wax has been contaminated. The process may also be continuous or intermittent.

In considering the degree of purification or the quality of oils and waxes, it is to be noted that in the case of fatty oils and waxes, greatest importance is attached to saponification value, acid value and iodine value, whereas in the case of compounded oils of predominating mineral oil composition, the most important characteristics are generally neutralization value, flash and fire points, viscosity and the analytical determination of the quantity of the oil soluble additive substance with which the mineral oil is compounded. Another factor usually considered significant is the color of the treated product, both from the aspect of physical appearance which is of commercial importance and also since the appearance may indicate the presence or absence of appreciable quantities of oxidation or other products foreign to the normal characteristics of the oil or wax which has been treated. Tables are given below showing the properties of several oils and waxes subjected to a treatment utilizing a combined process of adsorption and distillation under vacuum and at different temperatures. The oils and waxes are grouped into three classes; namely, (1) vegetable oils and waxes, (2) animal oil and waxes, and (3) compounded oils of the class consisting of mineral oils compounded with an oil soluble additive substance. Under the group of vegetable oils and waxes, I have selected coconut oil, palmoil and soybean oil; under the group of animal oils and waxes I have selected yellow grease, lard oil and sperm oil; and under the group of compounded oils I have selected mineral oil compounded with lard oil, mineral oil compounded with a sulfur compound and mineral oil compounded with a sulfur and chlorine compound. The selected oils and waxes are widely used in industry and commerce.

The Tables I, II and III hereinafter set forth give the result on a series of re-refining operations for three representatives of the class consisting of vegetable oils and waxes.

In Table I are given the results on a series of re-refining operations made on coconut oil at the temperatures shown in the column headings. In every case the treatment was carried out for a period of 30 minutes with substantially identical proportions of adsorbent, and under substantially identical conditions of vacuum which was maintained at substantially 29.75 inches of mercury. The difference in temperatures noted were the only variables. In the first column are given the normal characteristics of the refined oil, as determined from a standard work of reference. The second column gives the characteristics for the contaminated oil before being subjected to the re-refining process. The oil being treated had become contaminated or was incompletely refined, and was considered to be unfit for the purpose for which it had been intended, namely, that of making a liquid soap which was intended to be completely clear and transparent.

It will be observed that maximum yields of a product of excellent appearance and of desirable physical and chemical characteristics were obtained at those temperatures where azeotropic distillation at the pressure utilized was beginning; namely, approximately at 250° F. At temperatures greatly below this value, that is, below the incipient azeotropic distillation point, a desirable degree of purification was not obtained, while at temperatures greatly above this value, the same effects were observed insofar as refining was concerned, and in addition, the yields of product were greatly diminished.

The second table gives the results of a similar series of tests conducted on a greatly contaminated sample of palmoil. This oil had been used in the cold rolling of steel strip, and contained a considerable quantity of soluble metallo-organic compounds, as evidenced by the high amount of metal oxides found in the ash from the samples. As before, substantially identical proportions of adsorbent were used in the treatments at various temperatures and the time and vacuum were substantially constant at the same value as for Table I. The first column gives the normal characteristics of well-refined palmoil, and the second column gives the characteristics of the contaminated oil before being subjected to the re-refining process.

TABLE I

*Coconut oil*

|  | Normal characteristics | Original sample | Temperature | | | | | | |
|---|---|---|---|---|---|---|---|---|---|
|  |  |  | 200° F. | 225° F. | 250° F. | 300° F. | 350° F. | 400° F. | 450° F. |
| Acid No | 2.5–10.0 | 1.5 | 1.7 | 1.8 | 2.7 | 3.7 | 5.2 | 6.0 | 6.7 |
| Sap. No | 253–262 | 245 | 249 | 254 | 256 | 245 | 244 | 235 | 235 |
| Color | | 2½ | 1½ | ½ | ½ | ½ | 1 | 1½ | 3— |
| Iodine No | 6.2–10.0 | 10.8 | 10.1 | 9.6 | 8.3 | 8.0 | 7.2 | 6.5 | 4.9 |
| Condensate for azeotropic distillation____percent | | | 0 | 0 | .33 | .67 | 1.0 | 1.7 | 6.0 |
| Yield of product____do | | | 94 | 92 | 91 | 90 | 84 | 77 | 66 |

The best yields of a product of greatly improved appearance and desirability were obtained, as in the preceding example, at those temperatures where azeotropic distillation of the mixture of fatty substances in the palmoil began; namely, approximately at 300° F. At temperatures greatly in excess of this, increase in acid value was observed, while a decrease was noted in the iodine value. The lowest value for ash was obtained at the highest temperature employed, but this was counterbalanced by the departures from normal of other characteristics. At temperatures much less than the incipient azeotropic distillation point, a satisfactory degree of improvement was not obtained.

Table III shows the results obtained when a series of re-refining treatments were carried out at various temperatures on a sample of soybean

TABLE II

*Palmoil*

|  | Normal characteristics | Original sample | 200° F. | 250° F. | 300° F. | 350° F. | 400° F. | 450° F. |
|---|---|---|---|---|---|---|---|---|
| Acid No | 5–22 | 24.6 | 23.9 | 22.8 | 23.0 | 23.3 | 23.7 | 24.4 |
| Sap. No | 200–205 | 193 | 195 | 198 | 198 | 198 | 199 | 203 |
| Color | Yellow | Black | Black | Brown | Brown | Brown | Brown | Brown |
| Iodine No | 49–59 | 55.7 | 55.5 | 55.0 | 54.6 | 53.2 | 52.0 | 50.4 |
| Ash____per cent | Less than 0.10 | 3.45 | 3.24 | 2.91 | 2.49 | 2.27 | 1.96 | 1.54 |
| Condensate for azeotropic distillation____do | | | 0 | 0 | .2 | .7 | 1.0 | 1.5 |
| Yield of product____do | | | 95 | 94 | 90 | 87 | 82 | 78 | oil which was contaminated by being left in open containers and allowed free access to the atmosphere. The first column shows the usual properties of normal well-refined soybean oil as given in a standard reference work. The second column gives the characteristics of the contaminated soybean oil. In each of the subsequent columns, the results are given of the treatment of this oil by a process of re-refining consisting of adsorption and distillation where the proportion of adsorbent and the time and vacuum are held substantially constant, the same as Tables I and II, and where the differences in temperature noted were the only variables.

tillation of fatty products was involved, the results of the re-refining process were unsatisfactory, giving a yield which is uneconomically low, and a product which differs substantially from new well-refined oil in chemical characteristics and color. The range of operation for satisfactory results embraces approximately 100° F. on either side of the incipient azeotropic distillation point of the contsituents of the fatty substance in its finally treated state. For cocoanut oil the range is approximately 150° F. to 350° F.; for palmoil, 200° F. to 400° F., and for soybean oil 250° F. to 450° F.

The Tables IV, V and VI hereinafter set forth

TABLE III

*Soybean oil*

| | Normal characteristics | Original sample | 200° F. | 250° F. | 300° F. | 350° F. | 400° F. | 450° F. |
|---|---|---|---|---|---|---|---|---|
| Acid No | 0.3–1.8 | 1.4 | 1.3 | 1.2 | 1.4 | 2.8 | 5.2 | 10.1 |
| Sap. No | 189–194 | 198 | 198 | 197 | 196 | 202 | 203 | 206 |
| Color | Pale straw | 3 | 1½ | 1– | 1– | 1 | 1½– | 2 |
| Iodine No | 122–134 | 131.3 | 130.1 | 130.0 | 128.8 | 125.1 | 122.3 | 118.0 |
| Condensate for azeotropic distillation...per cent | | | 0 | 0 | 0 | .2 | .3 | .5 |
| Yield of product...do | | | 96 | 96 | 90 | 86 | 80 | 75 |

Maximum yields of a product completely satisfactory in all respects was obtained at these temperatures where the smallest amounts of products of the distillation of azeotropic mixtures of fatty subtsances in the soybean oil were obtained; namely, approximately at 350° F. At temperatures much less than that, the product was unsatisfactory from the standpoint of purification. On the other hand, where the temperatures employed were greatly in excess of the incipient azeotropic distillation point, a grave deterioration of the product was noted, and yields were correspondingly low.

Consideration of the results of the three examples given above has shown that in every instance there was a well defined temperature range for best results, and this coincided with the temperature at which distillation commenced of the azeotropic mixtures of fatty compounds entering into the composition of the vegetable oils being treated. When low temperatures were employed, that is, temperatures at which no azeotropic distillation could occur under the conditions of operation, I have found that in nearly all cases an insufficient degree of re-refining was obtained and that although some degree of improvement was observed much better results were almost always obtained when the temperature was increased to a point where incipient azeotropic distillation was noted. Similarly, I have discovered that where very high temperatures were used, that is to say, where a considerable degree of disgive the results on a series of re-refining operations for three representatives of the class consisting of animal oils and waxes. In Table IV are given the results on a series of re-refining operations made on yellow grease at the temperatures shown in the column headings. Yellow grease is a technical and accepted designation for a fat obtained from the carcasses of hogs not suitable for utilization as a food. This substance is widely used in the manufacture of soap and lubricating greases. As explained with reference to the tables for vegetable oils, substantially identical proportions of adsorbent were used in the treatment of the samples at the temperatures noted. Substantially identical conditions of vacuum were maintained at a value of substantially 29.75 inches of mercury and the time of treatment was held constant in each case at substantially 30 minutes. With the exception of the temperatures which were held constant at the values appearing at the head of each column the conditions of test were held constant for all of the results which are reported in Tables I, II and III. The first column gives the normal characteristics of commercial yellow grease, and the second column gives the characteristics of the contaminated yellow grease before being subjected to the re-refining process.

TABLE IV

*Yellow grease*

| | Normal characteristics | Original sample | Treatment temperatures | | | | | | |
|---|---|---|---|---|---|---|---|---|---|
| | | | 200° F. | 250° F. | 300° F. | 325° F. | 350° F. | 400° F. | 450° F. |
| Acid No | 0.5–3.0 | 2.6 | 2.5 | 2.2 | 2.0 | 1.7 | 1.5 | 1.8 | 2.1 |
| Sap. No | 195–198 | 194 | 195 | 196 | 198 | 198 | 196 | 196 | 197 |
| Color | Yellow to brown | Brown | Brown | Light brown | Gray | Gray white | Yellow brown | Light brown | Light brown |
| Iodine No | 60–80 | 67.3 | 67.3 | 67.0 | 66.8 | 66.5 | 66.2 | 65.8 | 65.1 |
| Condensate for azeotropic distillation, percent | | | Nil | Nil | 0.1 | 0.15 | 0.3 | 0.8 | 1.9 |
| Yield of product, percent | | | 93 | 93 | 90 | 88 | 85 | 80 | 73 |

The above tests show that the maximum yield of a product of excellent appearance and of desirable physical and chemical characteristics were obtained at those temperatures where azeotropic distillation at the pressure utilized were beginning; namely, approximately at 300° F. At temperatures greatly below this value, that is, below the incipient azeotropic distillation point, a desirable degree of purification was not obtained, while at temperatures greatly above this value, the same effects were observed insofar as refining was concerned and in addition, the yields of products were greatly diminished.

The Table V gives the results of a similar series of tests conducted on a contaminated sample of lard oil at the temperatures shown in the column headings. Lard oil is a fatty substance which is obtained by expressing lard obtained from the carcasses of hogs. Some inferior grades of lard oil are obtained by expressing yellow grease as hereinbefore described. All grades of lard oil find a wide application in commerce and industry. The lower grades are much used for the preparation of industrial oils and lubricants. As in the previous examples, substantially identical proportions of adsorbent were used in the treatments at various temperatures and the time in the vacuum were substantially constant at the same values as for the preceding tables. The first column gives the normal characteristics of a well-refined lard oil and the second column gives the characteristics of the contaminated lard oil before being subjected to the re-refining process.

series of re-refining treatments were carried out at various temperatures on a sample of sperm oil which was contaminated. Sperm oil is one of the only two known liquid waxes; it contains substantially no glycerides, but consists chiefly of compound esters of fatty acids and monovalent alcohol, and is liquid at temperatures as low as 40° F. It is used as a lubricant for delicate mechanisms such as chronometers and aircraft instruments, since it resists oxidation from the oxygen in the atmosphere. The first column shows the usual properties of normal well-refined sperm oil as given in a standard reference work. The second column gives the characteristics of the contaminated sperm oil. In each of the subsequent columns, the results are given of the treatment of this oil by a process of re-refining consisting of adsorption and distillation where the proportion of adsorbent and the time and the vacuum are held substantially constant, the same as in the preceding tables, and where the differences in temperature noted were the only variables.

The maximum yields of a product completely satisfactory in all respects was obtained at these temperatures where the smallest amount of product of the distillation of azeotropic mixtures of fatty substances in the sperm oil were obtained; namely, approximately at 300° F. At temperatures much less than that, the product was un-

TABLE V

*Lard oil*

| | Normal characteristics | Original sample | 200° F. | 250° F. | 275° F. | 300° F. | 350° F. | 400° F. |
|---|---|---|---|---|---|---|---|---|
| Acid No | 1.0–1.8 | 3.4 | 3.0 | 2.8 | 2.5 | 2.4 | 2.6 | 2.9. |
| Sap. No | 193–200 | 194 | 196 | 197 | 198 | 198 | 199 | 200. |
| Color | Straw | Dark brown | Brown | Light brown | Dark yellow | Dark yellow | Light brown | Light brown. |
| Iodine No | 62–80 | 69.8 | 69.0 | 68.5 | 68.0 | 67.7 | 67.3 | 66.8. |
| Condensate for azeotropic distillation......per cent | | | Nil | 0.08 | 0.25 | 0.4 | 1.3 | 4.6. |
| Yield of product......do | | | 94 | 90 | 88 | 85 | 80 | 77. |

TABLE VI

*Sperm oil*

| | Normal characteristics | Original sample | 200° F. | 250° F. | 300° F. | 325° F. | 350° F. | 400° F. |
|---|---|---|---|---|---|---|---|---|
| Acid No | 12–15 | 18.7 | 17.5 | 16.6 | 15.6 | 15.0 | 14.5 | 14.0. |
| Sap. No | 120–140 | 123.4 | 123.8 | 124.0 | 125.3 | 126.5 | 127.0 | 127.3. |
| Color | Straw | Dark brown | Brown | Brown | Light brown | Dark yellow | Light brown. | Light brown. |
| Iodine No | 80–84 | 86.1 | 86.0 | 85.7 | 85.6 | 85.3 | 85.0 | 84.6. |
| Condensate for azeotropic distillation......per cent | | | Nil | Nil | 0.05 | 0.18 | 0.63 | 2.4. |
| Yield of product......do | | | 90 | 89 | 85 | 82 | 80 | 73. |

As is observed from the above table, the best yields of a product of greatly improved appearance and desirability were obtained, as in the preceding examples, at those temperatures where azeotropic distillation of the mixture of fatty substances in the lard oil began; namely, approximately at 250° F. At temperatures greatly beyond this value, that is, below the incipient azeotropic distillation point, a desirable degree of purification was not obtained, while at temperatures greatly above this value, the same effects were observed insofar as refining was concerned, and in addition, the yields of products were greatly diminished.

Table VI shows the results obtained when a satisfactory from the standpoint of purification. On the other hand, where the temperatures employed were greatly in excess of the incipient azeotropic distillation point an observable deterioration of the product was noted, and yields were correspondingly low.

Consideration of the results of the three examples of the animal oils and waxes given above has shown that in every instance there was a well defined temperature range for best results, and this coincided with the temperature at which distillation commenced of the azeotropic mixtures of fatty compounds entering into the composition of the animal oils and waxes being treated. When low temperatures were employed, that is, temperatures at which no azeotropic distillation could occur under the conditions of operation, I have found that in nearly all cases an insufficient degree of re-refining was obtained and that although some degree of improvement was observed much better results were almost always obtained when the temperature was increased to a point where incipient azeotropic distillation was noted. Similarly, I have discovered that where very high temperatures were used, that is to say, where a considerable degree of distillation of fatty products was involved, the results of the re-refining process were unsatisfactory, giving a yield which is uneconomically low, and a product which differs substantially from new well-refined oil in chemical characteristics and color. The range of operation for satisfactory results embraces approximately 100° F. on either side of the incipient azeotropic distillation point of the constituents of the fatty substance in its finally treated state. For yellow grease the range is approximately 200° F. to 400° F.; for lard oil, 150° F. to 350° F. and for sperm oil, 200° F. to 400° F.

The next or third group considered is one of the most important in industry. It has been found through the years that usually an oil consisting of a single component is not completely suitable for many specific purposes, particularly with the development of modern high-speed heavy duty machinery. For many purposes it is necessary to use an oil or lubricant compounded with a mineral hydrocarbon and a substance soluble in that hydrocarbon to materially improve or accentuate some desirable property. For example, it will be noted that modern Diesel engines are usually lubricated with solutions of detergent materials in mineral oil of low carbon content. For metal working, cutting, broaching, and similar operations, it is usually necessary to use mineral oils compounded with fat, sulfur compound, chlorine compound, or mixtures of these compounds; and in many aircraft engine lubricants, it is desirable or necessary to use mineral oils containing in solution small amounts of oil soluble esters, such as the esters of oxidized petroleum products and certain phosphoric and phosphorous acids. I have found that the process herein described is suitable for the re-refining of such compounded oils, and is a desirable and economical adjunct to the use of such compounded oils and lubricants, since many are relatively costly, and since their usefulness is limited by the extent to which deterioration may occur in service. I have also found that the conditions of re-refining may be so controlled that the adsorbent will not remove the oil-soluble active compounds dissolved in the oil. That these conditions may be adequately defined and recognized, the following examples are given to show the limitations involved and the means by which I have defined them.

The Tables VII, VIII and IX give the results on a series of re-refining operations made on compounded oils of group 3; namely, mineral oils compounded with lard oil, mineral oils compounded with oil soluble sulfur compound, and mineral oils compounded with oil soluble sulfur and chlorine compounds. These oils are commonly used in the working or metal and are usually referred to in the trade as cutting oils. Thus the mineral oils compounded with lard oils may be referred to as lard cutting oils, mineral oils compounded with an oil soluble sulfur compound may be referred to as sulfur cutting oils, and mineral oils compounded with oil soluble and chlorine compounds may be referred to as sulfur and chlorine cutting oils.

In Table VII are given the results on a series of re-refining operations made on lard cutting oil at the temperatures shown in the column headings. In every case the treatment was carried out for a period of 30 minutes with substantially identical proportions of adsorbent and under substantially identical conditions of vacuum which was maintained at substantially 29.75 inches of mercury. The differences in temperatures noted were the only variables. In the Table VII as well as in the Tables VIII and IX, no designation is made concerning the normal characteristics of the cutting oils for the reason that the proportion of the oil soluble compound to the mineral hydrocarbon may vary to meet any particular application. The first column gives the characteristics for the contaminated cutting oil before being subjected to the re-refining process.

TABLE VII

*Lard cutting oil*

|  | Original sample | 200° F. | 250° F. | 300° F. | 325° F. | 350° F. | 400° F. |
|---|---|---|---|---|---|---|---|
| Neutr. No | 5.6 | 5.5 | 5.3 | 4.8 | 4.5 | 4.4 | 4.2. |
| Sap. No | 21.6 | 19.9 | 19.8 | 19.8 | 19.7 | 19.6 | 19.3. |
| Flash point, °F | 325 | 330 | 335 | 345 | 345 | 340 | 340. |
| Fire point, °F | 370 | 380 | 380 | 390 | 390 | 390 | 385. |
| Color | Dark brown | Dark brown | Dark brown | Brown | Light brown | Light brown | Light brown. |
| Vis. S. U. V. at 100° F | 205 | 209 | 213 | 220 | 222 | 222 | 223. |
| Condensate for azeotropic distillation_____per cent |  | 0 | 0 | .3 | 2.1 | 4.5 | 8.3. |
| Yield of product_____do |  | 94 | 90 | 87 | 82 | 77 | 71. |

As evidenced by the retention of the oil soluble compound as indicated by the saponification number, it will be observed that the maximum of yields of a product of excellent appearance and of desirable physical and chemical characteristics were obtained at those temperatures where azeotropic distillation at the pressure utilized was beginning; namely, approximately at 300° F. At temperatures greatly below this value, that is, below the incipient azeotropic distillation point, a desirable degree of purification was not obtained, while at temperatures greatly above this value, the same effects were observed insofar as refining was concerned and in addition, the yields of products were greatly diminished.

The Table VIII gives the results of a similar series of tests conducted on a contaminated sulfur cutting oil. As before, substantially identical proportions of adsorbent were used in the treatment at various temperatures and the time and vacuum were substantially constant at the same value as set forth in the previous table. The first column gives the characteristics of the contaminated sulfur cutting oil before being subjected to the re-refining process.

Table VIII
Sulfur cutting oil

| | Original sample | 200° F. | 250° F. | 275° F. | 300° F. | 350° F. | 400° F. |
|---|---|---|---|---|---|---|---|
| Neutr. No | 8.7 | 7.2 | 6.9 | 6.5 | 6.1 | 5.9 | 5.8. |
| Sulfur, percent | 3.87 | 4.01 | 4.36 | 4.48 | 4.60 | 4.50 | 4.2. |
| Flash point, ° F | 335 | 340 | 345 | 345 | 350 | 345 | 340. |
| Fire point, ° F | 390 | 390 | 395 | 395 | 395 | 390 | 390. |
| Color | Black | Black | Black | Dark brown | Dark brown | Dark brown | Dark brown. |
| Vis. S. U. V. at 100° F | 137 | 141 | 145 | 151 | 153 | 150 | 150. |
| Condensate for azeotropic distillation per cent | | 0 | .2 | 1.4 | 3.6 | 5.7 | 8.8. |
| Yield of product do | | 95 | 92 | 89 | 85 | 80 | 78. |

As evidenced by the retention of the oil soluble compound as indicated by the analytical determination of the sulfur content, the best yields of a product of greatly improved appearance and desirability were obtained at those temperatures where azeotropic distillation of the pressure utilized was beginning; namely, approximately at 250° F. At temperatures greatly below this value, that is, below the incipient azeotropic distillation point, a desirable degree of purification was not obtained, while at temperatures greatly above this value, the same effects were observed insofar as re-refining was concerned, and in addition, the yields of products were greatly diminished.

Table IX shows the results obtained when a series of re-refining treatments were carried out at various temperatures on a sample of contaminated sulfur and chlorine cutting oil. The first column gives the characteristics of the contaminated sulfur and chlorine cutting oil. In each of the subsequent columns, the results are given of the treatment of this cutting oil by a process of re-refining consisting of adsorption and distillation where the proportion of adsorbent and the time and vacuum are held substantially constant, the same as in the preceding tables, and where the differences in temperature noted were the only variables.

In consideration of the results of the three samples given in Tables VII, VIII and IX, it has been shown that in every instance there was a well defined temperature range for best results, and this coincided with the temperature at which distillation commenced of the azeotropic mixtures of the hydrocarbon compounds entering into the composition of the mineral oil which constitutes the major constituents of the compounded oils. When low temperatures were employed, that is, temperatures at which no azeotropic distillation could occur under the conditions of operation, I have found that in nearly all cases an insufficient degree of re-refining was obtained and that although some degree of improvement was observed much better results were almost always obtained when the temperature was increased to a point where incipient azeotropic distillation was noted. Similarly, I have discovered that where very high temperatures were used, that is to say, where a considerable degree of distillation of fatty products was involved, the results of the re-refining process were unsatisfactory, giving a yield which is uneconomically low, and a product which differs substantially from new well-refined oil in chemical characteristics and color. This is shown in the Tables VII, VIII and IX by the loss of the oil soluble active substance. The range of operation for satisfactory results embraces approxi-

Table IX
Sulfur and chlorine cutting oil

| | Original sample | 200° F. | 250° F. | 275° F. | 300° F. | 350° F. | 400° F. |
|---|---|---|---|---|---|---|---|
| Neutr. No | 6.9 | 6.1 | 5.6 | 5.5 | 5.4 | 5.2 | 5.0. |
| Sulfur, per cent | 2.99 | 3.13 | 3.60 | 3.65 | 3.63 | 3.58 | 3.50. |
| Chlorine, per cent | 1.21 | 1.03 | 1.12 | 1.18 | 1.21 | 1.20 | 1.05. |
| Flash point, ° F | 350 | 350 | 355 | 355 | 355 | 360 | 355. |
| Fire point, ° F | 405 | 400 | 400 | 405 | 405 | 410 | 410. |
| Color | Black | Dark brown | Dark brown | Dark brown | Brown | Brown | Brown. |
| Vis. S. U. V. at 100° F | 135 | 136 | 140 | 144 | 147 | 146 | 144. |
| Condensate for azeotropic distillation, per cent | | 0 | .4 | .9 | 3.1 | 5.3 | 7.7. |
| Yield of product, per cent | | 94 | 90 | 87 | 81 | 74 | 67. |

As evidenced by the retention of the oil soluble compound and as indicated by the analytical determination of the sulfur content and the chlorine content it will be noted that the maximum yield of a product of excellent appearance and of desirable physical and chemical characteristics were obtained at those temperatures where azeotropic distillation at the pressure utilized was beginning; namely, approximately at 250° F. At temperatures greatly below this value, that is, below the incipient azeotropic distillation point, a desirable degree of purification was not obtained, while at temperatures greatly above this value, the same effects were observed insofar as refining was concerned, and in addition, the yields of product were greatly diminished.

mately 100° F. on either side of the incipient azeotropic distillation point of the hydrocarbon which constitutes the major constituents of the compounded oils. For lard cutting oils the range is approximately 200° F. to 400° F.; for sulfur cutting oil, 150° F. to 350° F.; and for sulfur and chlorine cutting oil, 150° F. to 350° F.

Inasmuch as the proportion of oil soluble additive or active agent to the mineral hydrocarbon is usually the most important single property of any compounded oil, the removal or destruction of this additive or agent in a process of re-refining would very greatly diminish the value of the product. In my process of re-refining utilizing a combined action of distillation and adsorption, under vacuum, I have found that relatively low temperatures are generally sufficient for the removal of contaminating substances such as water, low molecular weight hydrocarbons and decomposition products by distillation and that at these same temperatures, adsorption of the relatively high molecular weight impurities which consist usually of polymerization and resinized products is effected with a high degree of completeness. In the subsequent step of separating or filtering the adsorbent material from the substances being treated all solid particles are removed, including carbonaceous matter and dirt or grit introduced extraneously. If relatively high temperatures are employed, I have found that the proportion of the desired oil soluble additive or active agent maintained is usually greatly diminished. It is not known whether the action is due to increased activity of the adsorbent or to decomposition of the oil soluble agent or to a combination of both of these effects, but the final result is invariably the same. It is, therefore, an important feature of my invention that I accomplish a high degree of purification of the contaminated compounded oils without injury to any of the constituents or components thereof.

Although I have described my invention with a certain degree of particularity, it is understood that the present disclosure has been made only by way of example and that numerous changes may be resorted to without departing from the spirit and the scope of the invention as hereinafter claimed.

I claim as my invention:

1. The process for removing impurities from a used fatty substance of the class consisting of animal oils and waxes, which process comprises mechanically mixing and agitating the fatty substance and a solid adsorbent material in a sealed container to adsorb the high boiling point impurities, heating the mixture of the fatty substance and the solid adsorbent material in the sealed container under vacuum at a temperature substantially in the range of the incipient azeotropic distillation point of the constituents of the fatty substance being treated to distill off the low boiling point volatile impurities, and separating the adsorbent material with its adsorbed impurities from the fatty substance being treated to recover the latter.

2. The process for removing impurities from a used fatty substance of the class consisting of animal oils and waxes, which process comprises mechanically mixing and agitating the fatty substance, a solid adsorbent material and an aqueous medium of the class consisting of water and steam in a sealed container to adsorb the high boiling point impurities, heating the mixture of the fatty substance being treated, the adsorbent material and the aqueous medium in the sealed container under vacuum at a temperature substantially in the range of the incipient azeotropic distillation point of the constituents of the fatty substance to distill off the water and the low boiling point volatile impurities, and separating the adsorbent material with its adsorbed impurities from the fatty substance being treated to recover the latter.

3. The process for removing impurities from a used lard oil, which process comprises mechanically mixing and agitating the lard oil and a solid adsorbent material in a sealed container to adsorb the high boiling point impurities, heating the mixture of the lard oil and the solid adsorbent material in the sealed container under vacuum at a temperature substantially in the range of the incipient azeotropic distillation point of the constituents of the lard oil being treated to distill off the low boiling point volatile impurities, and separating the adsorbent material with its adsorbed impurities from the lard oil being treated to recover the latter.

4. The process for removing impurities from a used fatty substance of the class consisting of animal oils and waxes, which process comprises mechanically mixing and agitating the fatty substance and a solid adsorbent material in a sealed container to adsorb the high boiling point impurities, heating the mixture of the fatty substance and the solid adsorbent material in the sealed container under vacuum at a temperature in a range which extends up to substantially 100° F. as a maximum beyond the incipient azeotropic distillation point of the constituents of the fatty substance being treated to distill off the low boiling point volatile impurities, and separating the adsorbent material with its adsorbed impurities from the fatty substance being treated to recover the latter.

5. The process for removing impurities from a used lard oil, which process comprises mechanically mixing and agitating the lard oil and a solid absorbent material in a sealed container to adsorb the high boiling point impurities, heating the mixture of the lard oil and the solid adsorbent material in the sealed container under vacuum at a temperature in a range which extends up to substantially 100° F. as a maximum beyond the incipient azeotropic distillation point of the constituents of the lard oil being treated to distill off the low boiling point volatile impurities, and separating the adsorbent material with its adsorbed impurities from the lard oil being treated to recover the latter.

6. The process for removing impurities from a used lard oil, which process comprises mechanically mixing and agitating the lard oil and a solid adsorbent material in a sealed container to adsorb the high boiling point impurities, heating the mixture of the lard oil and the solid adsorbent material in the sealed container under a reduced pressure of substantially one pound per square inch absolute as a maximum and at a temperature in a range which extends up to substantially 350° F. as a maximum to distill off the low boiling point volatile impurities, and separating the adsorbent material with its adsorbed impurities from the lard oil being treated to recover the latter.

RUSSELL P. DUNMIRE.